US011459440B2

(12) United States Patent
Doi

(10) Patent No.: US 11,459,440 B2
(45) Date of Patent: Oct. 4, 2022

(54) CONDUCTIVE URETHANE FOAM AND TONER SUPPLY ROLLER

(71) Applicant: BRIDGESTONE CORPORATION, Tokyo (JP)

(72) Inventor: Hirokazu Doi, Tokyo (JP)

(73) Assignee: Archem Inc., Tokyo (JP)

( * ) Notice: Subject to any disclaimer, the term of this patent is extended or adjusted under 35 U.S.C. 154(b) by 79 days.

(21) Appl. No.: 16/632,435

(22) PCT Filed: Jul. 23, 2018

(86) PCT No.: PCT/JP2018/027558
§ 371 (c)(1),
(2) Date: Jan. 20, 2020

(87) PCT Pub. No.: WO2019/022025
PCT Pub. Date: Jan. 31, 2019

(65) Prior Publication Data

US 2020/0224002 A1 Jul. 16, 2020

(30) Foreign Application Priority Data

Jul. 24, 2017 (JP) ............................ JP2017-143042

(51) Int. Cl.
*C08J 9/42* (2006.01)
*C08J 9/00* (2006.01)
*C08K 3/04* (2006.01)
*G03G 15/08* (2006.01)

(52) U.S. Cl.
CPC ............... *C08J 9/42* (2013.01); *C08J 9/0066* (2013.01); *C08K 3/04* (2013.01); *G03G 15/0887* (2013.01); *C08J 2375/04* (2013.01); *C08J 2483/04* (2013.01); *C08K 2201/001* (2013.01)

(58) Field of Classification Search
CPC ........... G03G 15/0887; G03G 15/0818; C09D 183/04; C08L 75/04; C08K 2201/001; C08K 3/04; C08J 2483/04; C08J 2375/04; C08J 9/42; C08J 9/0066; C08J 7/046; C08J 7/0427; C08G 77/04; C08G 77/12; C08G 77/16; C08G 77/18; C08G 77/20
See application file for complete search history.

(56) References Cited

U.S. PATENT DOCUMENTS 4,595,610 A 6/1986 Fey et al.
6,023,597 A * 2/2000 Mayuzumi ............ B08B 7/0028 29/460
2004/0244198 A1* 12/2004 Nakashima ........ G03G 15/0808 29/895.21
2008/0107451 A1* 5/2008 Nukada ............. G03G 15/0233 399/176
2008/0226357 A1* 9/2008 Sano .................. G03G 15/0818 399/286
2009/0012196 A1* 1/2009 Kim .......................... C08J 9/42 521/163
2011/0064486 A1 3/2011 Furuya
2011/0177926 A1 7/2011 Kusano et al.
2011/0188900 A1 8/2011 Kusano et al.
2014/0178107 A1 6/2014 Masuyama
2019/0324382 A1* 10/2019 Sugiyama .......... G03G 15/0815

FOREIGN PATENT DOCUMENTS

| | | |
|---|---|---|
| JP | S57115433 A | 7/1982 |
| JP | S6119658 A | 1/1986 |
| JP | 2002319315 A | 10/2002 |
| JP | 2003215905 A | 7/2003 |
| JP | 2003262997 A | 9/2003 |
| JP | 2009109762 A | 5/2009 |
| JP | 2010256708 A | 11/2010 |
| JP | 2011033838 A | 2/2011 |
| JP | 2011059505 A | 3/2011 |
| JP | 2012155207 A | 8/2012 |
| JP | 2013011726 A | 1/2013 |
| JP | 2013037197 A | 2/2013 |
| WO | 2009150953 A1 | 12/2009 |
| WO | 2010005058 A1 | 1/2010 |
| WO | 2013022041 A1 | 2/2013 |

OTHER PUBLICATIONS

Oct. 16, 2018, International Search Report issued in the International Patent Application No. PCT/JP2018/027558.
Jan. 28, 2020, International Preliminary Report on Patentability issued in the International Patent Application No. PCT/JP2018/027558.
Nov. 25, 2021, search result of Office Action issued by the China National Intellectual Property Administration in the corresponding Chinese Patent Application No. 201880049041.6.
Xiaoyan, Liu et al., Preparation and study of composite conductive shielding silicone rubber, 2013, 2013 national polymer academic paper Conference, p. 796.

* cited by examiner

*Primary Examiner* — John M Cooney
(74) *Attorney, Agent, or Firm* — Kenja IP Law PC

(57) ABSTRACT

An object of the present disclosure is to provide a conductive urethane foam capable of curbing changes in hardness and impact resilience thereof between prior to and after being impregnated with a binder resin, while keeping a stable charge-imparting effect thereof. To achieve the object, the present disclosure proposes a conductive urethane foam including an urethane foam substrate material having a surface layer impregnated with a binder resin containing a conducting agent: wherein the binder resin contains a silicone resin.

3 Claims, 1 Drawing Sheet

CONDUCTIVE URETHANE FOAM AND TONER SUPPLY ROLLER

TECHNICAL FIELD

The present invention relates to a conductive urethane foam and a toner supply roller.

BACKGROUND ART

A developing portion of an electrophotographic image forming device such as a copying machine, a printer, and the like generally includes: an image forming body 11 such as a photoreceptor for holding an electrostatic latent image thereon; a developing roller 12 provided adjacent to the image forming body 11 and carrying toner 15 on a surface thereof, for visualizing the electrostatic latent image on the image forming body 11 by attaching the toner thereto; and a toner supply roller 13 for supplying the toner to the developing roller 12. A series of processes of conveying the toner 15 from a toner storage portion 14 to the image forming body 11 by way of the toner supply roller 13 and the developing roller 12 forms an image.

The toner supply roller 13 has, for example, a structure in which a conductive elastic body such as an urethane foam is formed on the outer periphery of a shaft by way of an adhesion layer, in terms of preventing the toner supply roller 13 from damaging the developing roller 12 in contact therewith, ensuring good gripping performance of the toner supply roller by increasing a contact area thereof, and the like.

Various measures have been taken in order to improve performances like toner conveyance performance and toner charging performance required of the toner supply roller 13.

For example, each of PTLs 1 to 3 discloses a technique of impregnating a polyurethane foam body constituting a toner supply roller with conductive processing liquid of conductive carbon black or the like, thereby successfully reducing electric resistance of the toner supply roller, decreasing a charge amount of toner (Q/M) and thus increasing a conveyance amount of toner (M/A).

However, since the techniques of PTLs 1 to 3 unanimously impregnate an urethane foam with a conducting material, each of them has a problem that the influence of a charge due to frictions between toner on the toner supply roller 13, the toner supply roller itself and the developing roller cannot be prevented in a satisfactory manner, whereby it is not possible to obtain a high quality image stably throughout a long period.

In view of this, PTL 4 discloses, in order to well prevent the influence of a charge due to friction between toner on a toner supply roller and a developing roller and stabilize and enhance a charge-imparting effect thereof, thereby obtaining a high quality image (and improving performances of the rollers in terms of stability), an urethane foam and a toner supply roller using the urethane foam, wherein the urethane foam has a surface layer impregnated with a binder resin containing a conducting agent which is positioned identical to an urethane foam substrate material or closer to a positive side than the urethan foam substrate material in a triboelectric series.

CITATION LIST

Patent Literature

PTL 1: JP S57-115433 Laid-Open
PTL 2: JP 2002-319315 Laid-Open
PTL 3: JP 2003-215905 Laid-Open
PTL 4: JP 2010-256708 Laid-Open

SUMMARY

The technique disclosed in PTL 4 stabilizes and enhances a charge-imparting effect of the rollers, thereby making it possible to obtain a high quality image. However, the urethane foam impregnated with a binder resin of PTL 4 tends to exhibit, after the impregnation with the binder resin, an increase in hardness and a decrease in impact resilience, thereby still having room for further improvement in this regard.

In view of this, an object of the present disclosure is to provide a conductive urethane foam capable of curbing changes in hardness and impact resilience thereof between prior to and after being impregnated with a binder resin, while keeping a stable charge-imparting effect thereof. Another object of the present disclosure is to provide a toner supply roller capable of causing a satisfactory charge-imparting effect and achieving good performances in an excellently stable manner.

As a result of a keen study to achieve the aforementioned objects, the inventors of the present disclosure discovered that it is possible to more stably obtain a satisfactory charge-imparting effect than the prior art by impregnating a surface layer of an urethan foam substrate material of a conductive urethane foam with a binder resin containing a conducting agent and that it is possible to more effectively curb changes in hardness and impact resilience of the conductive urethane foam between prior to and after its being impregnated with the binder resin than the prior art by selecting a binder resin of an appropriate type.

Specifically, a conductive urethane foam of the present disclosure is a conductive urethane foam including an urethane foam substrate material having a surface layer impregnated with a binder resin containing a conducting agent, wherein the binder resin contains a silicone resin.

The aforementioned structural feature makes it possible to curb changes in hardness and impact resilience of the conductive urethane foam between prior to and after its being impregnated with the binder resin, while keeping a stable charge-imparting effect thereof.

In the conductive urethane foam of the present disclosure, a content of the silicone resin in the conductive urethane foam is preferably in the range of 0.3 to 6.0 parts by mass with respect to 100 parts by mass of the urethane foam substrate material. In this case, changes in hardness and impact resilience of the conductive urethane foam between prior to and after its being impregnated with the binder resin can be further reduced.

Further, in the conductive urethane foam of the present disclosure, it is preferable that the conducting agent is Ketjen black and it is more preferable that a content of Ketjen black in the conductive urethane foam is in the range of 0.45 to 9.0 parts by mass with respect to 100 parts by mass of the urethane foam substrate material. In this case, changes in hardness and impact resilience of the conductive urethane foam between prior to and after its being impregnated with the binder resin can be further reduced.

It is preferable that the silicone resin is at least one selected from the group consisting of peroxide-curable silicone, condensation-type thermosetting silicone, addition-type thermosetting silicone, and cationic UV-curable silicone. In this case, changes in hardness and impact resilience of the conductive urethane foam between prior to and after its being impregnated with the binder resin can be further reduced.

A toner supply roller of the present disclosure is characterized in that it is made of the conductive urethane foam of the present disclosure described above. The toner supply roller having the aforementioned structure can realize a satisfactory charge-imparting effect and excellent stability in achieving good performances.

According to the present disclosure, it is possible to provide a conductive urethane foam capable of curbing changes in hardness and impact resilience thereof between prior to and after being impregnated with a binder resin, while keeping a stable charge-imparting effect thereof. Further, according to the present disclosure, it is possible to provide a toner supply roller capable of causing a satisfactory charge-imparting effect and achieving good performances in an excellently stable manner.

DETAILED DESCRIPTION

Figure 1:
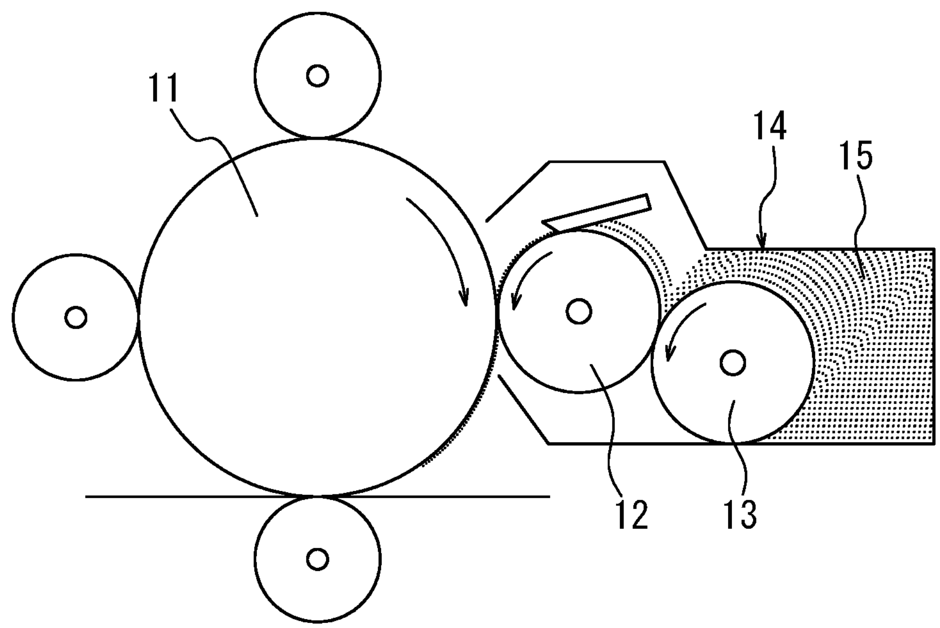
FIG. 1 is a partial sectional view schematically showing an example of an image forming device.

Hereinafter, an embodiment of the present disclosure will be described with referring to the drawings according to necessity.

<Conductive Urethane Foam>

A conductive urethane foam of the present disclosure is a conductive urethane foam including an urethane foam substrate material having a surface layer impregnated with a binder resin containing a conducting agent.

It is possible to stably realize a satisfactory charge-imparting effect and obtain a high quality image by impregnating a surface layer of the urethane foam substrate material with a binder resin containing a conducting agent.

(Urethane Foam Substrate Material)

Type of the urethane foam substrate material constituting the conductive urethane foam of the present disclosure is not particularly restricted and any known urethane foam can be appropriately used according to an application and a purpose.

The urethane foam substrate material can be manufactured, for example, by mixing and stirring a compound having two or more active hydrogen atoms and a compound having two or more isocyanate groups under the presence of additives such as catalyst, foaming agent, foam stabilizer, and the like, to cause the mixture to foam and be cured. For instance, the urethane foam substrate material can be manufactured by: preparing a polyether polyol material including a "mixture of single diols containing two types of single diols of which difference in the average molecular weight is in the range of 800 to 3600" by an amount of ≥50 mass % in total with respect to a polyol component; mixing the polyether polyol material with isocyanate, water, a catalyst and a foaming agent, to cause the mixture to foam; and leaving the mixture (until the reaction is completed).

In the present disclosure, a "single diol" comprehensively represents a diol or a group of two or more diols of which difference in the average molecular weight is 400. A "difference in the average molecular weight" represents a difference in the average molecular weights of the respective designated diols and, in a case where a plurality of combinations of diols, i.e. a plurality of differences in the average molecular weights of diols, exist, represents the largest difference in the average molecular weights of the diols.

Examples of the polyol component for use in manufacturing the prepolymer or the urethane foam substrate material include: polyether polyol obtained by addition polymerization of ethylene oxide and propylene oxide; polytetramethylene ether glycol; polyester polyol obtained by condensation of an acid component and a glycol component; polyester polyol obtained by ring-opening polymerization of caprolactone; polycarbonate diol; and the like.

In the present disclosure, examples of the polyether polyol for use in manufacturing the urethane foam substrate material include: (A) polyether polyol obtained by adding only propylene oxide to diethylene glycol; (B) polyether polyol obtained by adding propylene oxide and ethylene oxide in a block/random manner to diethylene glycol; (C) polyether polyol obtained by grafting acryl nitrile or styrene to the polyether polyol of (A) or (B) above; and the like. The polyether polyol of type (A) above is preferable among these examples in terms of ensuring demonstration of a desired effect.

Examples of an initiator for use in manufacturing the polyether polyol described above include polyhydric alcohol, polyhydric phenol, monoamine, polyamine, and the like. Polyhydric alcohol and polyhydric phenol are preferable and polyhydric alcohol such as ethylene glycol, diethylene glycol, triethylene glycol, propylene glycol, 1,3-butanediol, 1,4-butanediol is more preferable among these examples. Diethylene glycol is particularly preferable.

The aforementioned polyether polyol component may contain a polyol component other than diol. Examples of the polyol component other than diol include: those having three functional groups generally for use in manufacturing an urethane foam substrate material, e.g. that obtained by adding alkylene oxide such as propylene oxide to a glycerin base, that obtained by adding, to a glycerin base, two types of alkylene oxides such as propylene oxide and ethylene oxide in a block/random manner, etc.; those having multi-functional groups, e.g. polyether polyol obtained by adding the alkylene oxide or the like as described above to a saccharose base; and the like.

Examples of polyether polyol obtained by addition polymerization of ethylene oxide and propylene oxide include those obtained by subjecting a starting material such as water, propylene glycol, ethylene glycol, glycerin, trimethylolpropane, hexanetriol, triethanolamine, diglycerin, pentaerythritol, ethylenediamine, methyl glucoside, aromatic diamine, sorbitol, sucrose, phosphoric acid, or the like to addition polymerization with ethylene oxide and propylene oxide. Those using water, propylene glycol, ethylene glycol, glycerin, trimethylolpropane, hexanetriol as the starting material are preferable among these examples. With regard to a ratio of ethylene oxide and propylene oxide thus added and a microstructure thereof, a ratio of ethylene oxide is preferably in the range of 2 to 95 mass % and more preferably in the range of 5 to 90 mass % and the terminals of a resulting polyether polyol preferably have ethylene oxide added thereto. Ethylene oxide and propylene oxide are arranged preferably at random in the molecular chain.

Further, with regard to the molecular weight of the polyether polyol, in a case where the starting material is water, propylene glycol, ethylene glycol and thus has two functional groups, the weight-average molecular weight of the resulting polyether polyol is preferably in the range of 300 to 6,000 and more preferably in the range of 3,000 to 5,000. In a case where the starting material is glycerin, trimethylolpropane, hexanetriol and thus has three functional groups, the weight-average molecular weight of the resulting polyether polyol is preferably in the range of 900 to 9,000 and more preferably in the range of 4,000 to 8,000. The difunctional polyol and the trifunctional polyol may be appropriately blended for use in this regard.

Polytetramethylene ether glycol described above can be obtained by cationic polymerization of tetrahydrofuran, and the weight-average molecular weight thereof for use is preferably in the range of 400 to 4,0000 and particularly preferably in the range of 650 to 3,000. Polytetramethylene ether glycols having different molecular weights may be blended. Further, polytetramethylene ether glycol obtained by copolymerization of alkylene oxides such as ethylene oxide, propylene oxide, and the like may be used.

Yet further, a polytetramethylene ether glycol and a polyether polyol obtained by addition polymerization of ethylene oxide and propylene oxide may be blended for use. In this case, a blend ratio by mass of the polytetramethylene ether glycol and polyether polyol is preferably in the range of 95:5 to 20:80, particularly preferably in the range of 90:10 to 50:50.

Yet further, it is acceptable to use, with the aforementioned polyol component, any of polymer polyol obtained by modifying a polyol with acrylonitrile, polyol obtained by adding melamine to a polyol, diols such as butanediol, polyols such as trimethylolpropane, and derivatives thereof in combination.

Examples of the aforementioned (poly)isocyanate component for use include aromatic isocyanate or derivatives thereof, aliphatic isocyanate or derivatives thereof, and alicyclic isocyanate or derivatives thereof. Aromatic isocyanate or derivatives thereof are preferable among these examples. Specifically, tolylene diisocyanate (TDI) or derivatives thereof, diphenylmethane diisocyanate (MDI) or derivatives thereof, and polymethylenepolyphenyl isocyanate or derivatives thereof are preferably used as either a single substance or two or more of them in mixture.

Examples of tolylene diisocyanate or derivatives thereof include crude tolylene diisocyanate, 2,4-tolylene diisocyanate, 2,6-tolylene diisocyanate, mixture of 2,4-tolylene diisocyanate and 2,6-tolylene diisocyanate, urea-modified products thereof, biuret-modified products thereof, carbodiimide-modified products thereof, and urethane-modified products thereof which have been further modified with polyol or the like. Examples of diphenylmethane diisocyanate or derivatives thereof include diphenylmethane diisocyanate or derivatives thereof obtained by phosgenation of diaminodiphenylmethane or derivatives thereof. Examples of the derivatives of diaminodiphenylmetane include polynuclear substances and the like and, specifically, pure diphenylmethane diisocyanate obtained from diaminodiphenylmethane, polymeric diphenylmethane diisocyanate obtained from a polynuclear substance of diaminodiphenylmethane, and the like can be used. With regard to the number of functional groups of the polymeric diphenylmethane diisocyanate, considering that a mixture of pure diphenylmethane diisocyanate and polymeric diphenylmethane diisocyanates having various numbers of functional groups is generally used, the average number of functional groups is preferably in the range of 2.05 to 4.00 and more preferably in the range of 2.50 to 3.50. Examples which can be used, of a derivative obtained by modifying the diphenylmethane diisocyanate or derivatives thereof described above, include an urethane-modified product (modified with polyol or the like), dimer obtained by uretidione formation, an isocyanurate-modified product, a carbodiimide/urethonimine-modified product, an allophanate-modified product, an urea-modified product, a biuret-modified product, and the like. Different types of diphenylmethane diisocyanate or derivatives thereof may be blended for use.

A method for manufacturing the prepolymer or the urethane foam substrate material include, for example, charging polyol and isocyanate in an appropriate vessel, stirring the mixture well, and insulating the mixture at temperature in the range of 30° C. to 90° C., preferably in the range of 40° C. to 70° C., for 6 to 240 hours, preferably for 24 to 72 hours. In this case, a quantity ratio of polyol and isocyanate is adjusted so that an isocyanate content in a resulting prepolymer is preferably in the range of 4 to 30 mass %, more preferably in the range of 6 to 15 mass %. When the isocyanate content is less than 4 mass %, the resulting prepolymer may not be stable and might be cured during storage, making itself unsuitable for use. When the isocyanate content exceeds 30 mass %, a content of isocyanate which has not been prepolymerized (and thus will be reacted with a polyol component and cured in a polyurethane curing reaction later according to a reaction mechanism similar to the "one shot" manufacturing method not experiencing the prepolymerization reaction) increases, thereby diminishing an effect of employing the method including prepolymerization.

Type of catalyst for use in the curing reaction of the urethane foam substrate material is not particularly restricted. Examples of the catalyst include: monoamines such as triethylamine, dimethylcyclohexylamine; diamines such as tetramethylethylenediamine, tetramethylpropanediamine, tetramethylhexanediamine; triamines such as pentamethyldiethylenetriamine, pentamethyldipropylenetriamine, tetramethylguanidine; cyclic amines such as triethylenediamine, dimethylpiperazine, methylethylpiperazine, methylmorpholine, dimethylaminoethylmorpholine, dimethylimidazole; alcohol amines such as dimethylaminoethanol, dimethylaminoethoxyethanol, trimethylaminoethylethanolamine, methylhydroxyethylpiperazine, hydroxyethylmorpholine; etheramines such as bis(dimethylaminoethyl) ether, ethylene glycol bis(dimethyl)aminopropyl ether; organic metal compounds such as stannous octoate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, phenylmercuric propionate salt, lead octenoate; and the like. These examples may be used either singly or by two or more types in combination.

(Binder Resin)

In the conductive urethane foam of the present disclosure, the binder resin contains a silicone resin.

It is possible, by using as a binder resin a silicone resin which has not been conventionally used as a binder resin, to suppress the urethane foam's being hardened after its substrate material being impregnated with the binder resin. As a result, it is possible to curb changes in hardness and impact resilience of the urethane foam to the minimum between prior to and after its being impregnated with the binder resin.

A "surface layer" of the urethane foam substrate material represents a layer formed by coating a skeleton of the urethane foam substrate material with a binder resin containing a conducting agent. The present disclosure does not particularly specify thickness of the surface layer (the layer as a coating of the binder resin) because a desired effect of the present disclosure can be obtained as long as at least a surface of the urethane foam substrate material has been impregnated with the binder resin. With regard to the impregnation of the urethane foam with the binder resin, impregnating at least a portion of the surface layer of the urethane foam suffices. However, it is preferable to impregnate the entire surface layer of the urethane foam substrate material with the binder resin in terms of curbing changes in hardness and impact resilience of the urethane foam to the minimum between prior to and after its being impregnated with the binder resin.

A content of the silicone resin contained in the binder resin is preferably ≤50 mass %, more preferably ≥70 mass %, and most preferably 100 mass %, of the binder resin in terms of further curbing the aforementioned changes in hardness and impact resilience of the urethane foam.

Further, a content of the silicone resin in the conductive urethane foam of the present disclosure is preferably in the range of 0.3 to 6.0 parts, more preferably in the range of 1.0 to 6.0 parts, further more preferably in the range of 2.0 to 6.0 parts, and most preferably in the range of 5.0 to 6.0 parts, with respect to 100 parts by mass of the urethane foam substrate material. In this case, the aforementioned changes in hardness and impact resilience of the conductive urethane foam can be further reduced. When the content of a silicon resin is less than 0.3 parts by mass with respect to 100 parts by mass of the urethane foam substrate material, carbon may not able to attach to the urethane foam and come off. When the content of a silicon resin exceeds 6.0 parts by mass with respect to 100 parts by mass of the urethane foam substrate material, the physical properties of the conductive urethane foam may change, thereby possibly failing to curb the aforementioned changes in hardness and impact resilience of the urethane foam in a satisfactory manner.

Type of the silicone resin contained in the binder resin is not particularly restricted as long as the silicone resin is a polymer compound having a main skeleton consisting of siloxane bonds. Any appropriate silicone resin can be selected for use according to a purpose and an application as desired. For example, the silicone resin is preferably a silicone resin composed of a main agent of liquid silicone gel and a curing agent in terms of improving workability and adhesion properties when the urethane foam substrate material is impregnated with the silicone resin. Examples of such a silicone resin as described above include a liquid silicone resin of addition reaction curing type, a thermocurable millable type silicone resin using a peroxide for vulcanization, and the like.

Further, the silicone resin is preferably at least one selected from the group consisting of peroxide-curable silicone, condensation-type thermosetting silicone, addition-type thermosetting silicone, and cationic UV-curable silicone in terms of further curbing the aforementioned changes in hardness and impact resilience of the urethane foam.

The binder resin may further contain, in addition to the silicone resin described above: acryl-based resin such as acrylic resin, polyacrylic ester resin, acrylic acid-styrene copolymer resin, acrylic acid-vinyl acetate copolymer resin; polyvinyl alcohol; polyacrylamide; polyvinyl chloride resin; urethane resin; vinyl acetate resin; butadiene resin; epoxy resin; alkyd resin; melamine resin; chloroprene rubber; and the like. These components may be used either each singly or as a mixture of two or more types in combination.

The binder resin can be used in the form of an impregnation solution obtained by adding an appropriate amount of a solvent such as water, toluene, ethyl acetate or the like to the binder resin. It is preferable that the solvent is added to the binder resin such that viscosity of a resulting impregnation solution is in the range of 5 cps to 300 cps (25° C.). Setting viscosity of the impregnation solution to be within the aforementioned range further facilitates the impregnation and adhesion operation of the binder resin.

An impregnation solution of the binder resin may further contain other additives according to necessity. Examples of such other additives include defoaming agent, surfactant, charge-control agent, and the like and a content thereof is preferably in the range of 0.001 to 10 parts by mass and more preferably in the range of 0.001 to 1 parts by mass with respect to 100 parts by mass of the impregnation solution.

(Conducting Agent)

The binder resin with which the conductive urethane foam of the present disclosure has been impregnated contains a conducting agent. The conducting agent is a material capable of imparting conductivity to the urethane foam substrate material when the urethane foam substrate material is impregnated therewith by way of the binder resin. Specific examples of the conducting agent include carbon-based conducting agent, ionic conducting agent, electronic conducting agent, and the like. These examples may be used either singly or by two or more types in combination.

The carbon-based conducting agent is preferable among the examples of the conducting agent because it is possible to obtain a good charge-imparting effect, while reducing the cost, by using the carbon-based conducting agent.

Examples of the carbon-based conducting agent include: gas black such as DENKA BLACK, Ketjen black, acetylene black; oil furnace black including ink black; thermal black; channel black; lamp black; and the like. Ketjen black is preferably used among these examples of the carbon-based conducting agent in terms of further curbing changes in hardness and impact resilience of the urethane foam between prior to and after its being impregnated with the binder resin.

With regard to Ketjen black described above, a content thereof in the conductive urethane foam of the present disclosure is preferably in the range of 0.45 to 9.0 parts by mass, more preferably in the range of 1.0 to 9.0 parts by mass, further more preferably in the range of 3.0 to 9.0 parts by mass, and particularly preferably in the range of 7.5 to 9.0 parts by mass, with respect to 100 parts by mass of the urethane foam substrate material. It is possible to yet further curb changes in hardness and impact resilience of the urethane foam between prior to and after its being impregnated with the binder resin by setting a content of Ketjen black to be within the aforementioned ranges.

Examples of the ionic conducting agent include: perchlorates of tetraethylammonium, tetrabutylammonium, dodecyltrimethylammonium (e.g. lauryltrimethylammonium), hexadecyltrimethylammonium, octadecyltrimethylammonium (e.g. stearyltrimethylammonium), benzyltrimethylammonium, modified fatty acid dimethylethylammonium; ammonium salts of chlorate, hydrochloride, bromate, iodate, fluoroborate, sulfate, alkyl sulfate, carboxylate, sulfonate; perchlorates, chlorates, hydrochlorides, bromates, iodates, fluoroborates, trifluoromethyl sulfate salts, sulfonates of alkali metal or alkali earth metal such as lithium, sodium, potassium, calcium, magnesium; and the like.

Examples of the electronic conducting agent include: conductive metal oxides such as tin oxide, titanium oxide, zinc oxide; metal such as nickel, copper, silver, germanium; and the like.

<Toner Supply Roller>

A toner supply roller of the present disclosure is characterized in that it uses the conductive urethane foam described above.

It is possible to realize a toner supply roller capable of causing a satisfactory charge-imparting effect and achieving good performances in an excellently stable manner by using the conductive urethane foam of the present disclosure therein.

The toner supply roller is, for example, a roller 13 for supplying toner 15 to a developing roller 12, as shown in FIG. 1, and has conductivity.

Figure 2:
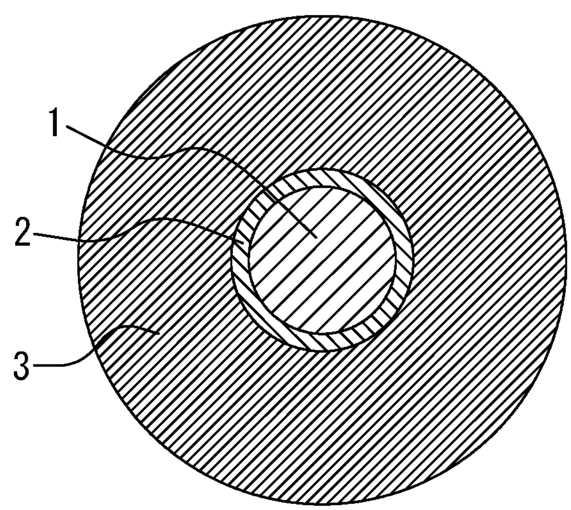
FIG. 2 is a sectional view schematically showing an embodiment of a toner supply roller of the present disclosure.

FIG. 2 schematically shows an example of the toner supply roller of the present disclosure. The toner supply roller of the present disclosure has the conductive urethane foam 3 of the present disclosure provided on the outer periphery of a shaft 1 by way of an adhesion layer 2 in FIG. 2.

Type of the shaft 1 for use in the toner supply roller of the present disclosure is not particularly restricted and any appropriate shaft can be used. Examples of the shaft 1 include: a metal shaft made of a steel material such as sulfur free-cutting steel and plated with nickel, zinc or the like; a metal shaft as a solid core metal body made of metal such as iron, stainless steel, aluminum; a metal shaft as a hollow metal cylindrical body; and the like. In the present disclosure, it is preferable that the shaft 1 has a diameter $\phi$ of less than 6 mm, e.g. 5.0 mm and the conductive urethane foam 3 of the present disclosure has thickness of less than 4.5 mm, e.g. 4.0 mm. It is possible, by setting the diameter of the shaft 1 and the thickness of the conductive urethane foam 3 to be within the aforementioned ranges, respectively, to reduce the weight of the roller and increase elastic modulus of the urethane foam as a whole due to the reduced thickness of the conductive urethane foam 3 of the present disclosure, thereby improving toner-scraping performance. Further, a decrease in volume of the urethane foam due to the reduced thickness of the conductive urethane foam 3 of the present disclosure results in a decrease in the amount of toner carried by the conductive urethane foam 3 of the present disclosure when the machine reached the limit of printing durability, thereby contributing to reducing toner consumption.

The toner supply roller of the present disclosure preferably has the adhesion layer 2 between the shaft 1 and the charge-controlled conductive urethane foam 3, as shown in FIG. 2. Preferable examples of an adhesive agent for use in the adhesion layer 2 include a heat-melting polymer adhesive agent containing as a main component an adipate polyurethane resin having the melting point of ≥120° C., preferably in the range of ≥130° C. and ≤200° C.

The adhesive agent may have any configuration including a film/pellet-like configuration. Thickness of the adhesion layer 2 is preferably in the range of 20 μm to 300 μm. Too small thickness of the adhesion layer 2 may generate adhesion failure and too large thickness thereof makes it difficult to attain a desirable resistance value of the roller, neither of which is preferable. The temperature at which the adhesive agent is brought into a melting state during adhesion work is set to be ≥100° C., specifically in the range of ≥130° C. and ≤200° C., which is preferably lower than the melting point of the adhesive agent. In this case, the adhesion layer 2 is brought into a semi-melting state during adhesion work, whereby voltage dependency of resistance value of the roller can be made explicit or easy to control, such that, e.g. the resistance value of the roller in the range of $10^6\Omega$ to $10^8\Omega$ is obtained at application of 5V and the resistance value of the roller in the range of $10^2\Omega$ to $10^4\Omega$ is obtained at application of 100V, which control contributes to increasing print density at the early stage of printing durability.

The toner supply roller 13 of the present disclosure can be manufactured, for example, by: forming the conductive urethane foam 3 of the present disclosure on the outer periphery of the shaft 1 by way of an adhesive agent as desired; and attaching the conductive urethane foam 3 of the present disclosure to the shaft 1 by heating at predetermined temperature.

For example, at first a charge-controlled urethane foam 3 is manufactured by: preparing an impregnation solution by mixing a binder resin and additives; immersing a block-shaped urethane foam (16 mm×1000 mm×2000 mm), which has not been subjected to a film-removal treatment, in a bath filled with the impregnation solution; compressing the urethane foam thus immersed, between two rolls; releasing the urethane foam and immersing it in the impregnation solution again for impregnation; raising the urethane foam above the bath and squeezing the excess impregnation solution from the urethane foam through nip rolls; and drying the urethane foam by heating in a hot air dying furnace at 100° C. for 10 minutes. The conductive urethane foam 3 of the present disclosure, which can be formed by the aforementioned method, is a foamed body having lower hardness (specifically, 30° to 90° in Asker F hardness) than that obtained by mechanical gas sealing.

Then, the toner supply roller 13 of the present disclosure can be obtained by: forming a film of an adhesive agent around the outer periphery of the shaft 1 by either winding a film-like adhesive agent around the outer periphery of shaft or melting and coating a pellet-like adhesive agent around the outer periphery; forming a bore in the conductive urethane foam 3 of the present disclosure and inserting through the bore the shaft 1 provided with the adhesive agent; heating the conductive urethane foam 3 and the shaft 1, thereby making them integral with each other by way of the adhesion layer 2; polishing a surface of the conductive urethane foam 3 of the present disclosure to have a desired cylindrical shape and cutting respective end portions thereof to have a desired finishing shape.

EXAMPLES

The present disclosure will be described further in detail by Examples hereinafter. The present disclosure is not limited by any means to these Examples.

Examples 1 to 8, Comparative Examples 1 to 3

Each of conductive urethan foam samples is/was prepared by impregnating a surface layer of a urethan foam substrate material thereof with a binder resin containing a conducting agent under the conditions shown in Table 1.

Each of the conductive urethan foam samples of Examples and Comparative Examples thus prepared is/was then subjected to the following evaluations.

(Evaluation)

(1) Change in Hardness of Urethane Foam between Prior to and After its being Impregnated with Binder Resin Asker F hardness of each of the conductive urethan foam samples of Examples and Comparative Examples is/was determined, specifically by measuring values of Asker F hardness of the urethane foam sample set on a rigid plate by an Asker rubber durometer F type, manufactured by KOBUNSHI KEIKI Co., Ltd., between prior to and after the sample being impregnated with the binder resin. The measurement is/was carried out by gently setting the urethane foam sample on the plate and reading a value of Asker F hardness thereof 10 seconds after the setting. The measurement results are shown in Table 1.

(2) Change in Impact Resilience of Urethane Foam between Prior to and After its being Impregnated with Binder Resin Impact resilience (%) of each of the conductive urethan foam samples of Examples and Comparative Examples is/was determined, specifically by: gently setting the urethane foam sample on a horizontal base, dropping a steel ball from the prescribed height onto the sample, and measuring a rebound height of the ball according to JIS K 6400 prior to the sample being impregnated with the binder resin; and carrying out the measurement in a similar manner after the sample being impregnated with the binder resin. The measurement results are shown in Table 1.

(3) Resistance Value of Conductive Urethane Foam

A resistance value (Log Ω·cm) is/was measured for each of the conductive urethan foam samples of Examples and Comparative Examples by using an analyzer ("Loresta-GX MCP-T700" manufactured by Mitsubishi Chemical Analytech Co., Ltd.) under the condition of applied voltage: 90V. The measurement results are shown in Table 1.

changes in hardness and impact resilience thereof between prior to and after being impregnated with a binder resin, while keeping a stable charge-imparting effect thereof. Further, according to the present disclosure, it is possible to provide a toner supply roller capable of causing a satisfactory charge-imparting effect and achieving good performances in an excellently stable manner.

REFERENCE SIGNS LIST

1 Shaft
2 Adhesion layer
3 Conductive urethane foam
11 Image forming body
12 Developing roller
13 Toner supply roller
14 Toner storage portion
15 Toner

TABLE 1

| | | Comparative Examples | | | Examples | | | | | | | |
|---|---|---|---|---|---|---|---|---|---|---|---|---|
| | | 1 | 2 | 3 | 1 | 2 | 3 | 4 | 5 | 6 | 7 | 8 |
| Components of conductive urethane foam (Content (parts by mass) with respect to 100 parts by mass of urethane foam substrate material) | | | | | | | | | | | | |
| Urethane foam substrate material *1 | | 100 | 100 | 100 | 100 | 100 | 100 | 100 | 100 | 100 | 100 | 100 |
| Binder resin A *2 | | 5 | 5 | 5 | — | — | — | — | — | — | — | — |
| Binder resin B *3 | | — | — | — | 0.3 | 1 | 5 | 6 | 7 | 5 | 5 | 5 |
| Conducting agent A *4 | | 5 | — | — | — | — | — | — | — | — | — | — |
| Conducting agent B *5 | | — | 7.5 | 7.5 | 7.5 | 7.5 | 7.5 | 7.5 | 7.5 | 0.45 | 9 | 10 |
| Defoaming agent *6 | | 0.2 | 0.2 | 0.2 | 0.2 | 0.2 | 0.2 | 0.2 | 0.2 | 0.2 | 0.2 | 0.2 |
| Evaluations | | | | | | | | | | | | |
| Hardness [Ask-F] | Prior to impregnation | 50 | 51 | 50 | 54 | 52.1 | 49 | 56 | 54 | 55.2 | 54.6 | 54.4 |
| | After impregnation | 60 | 60 | 55 | 56 | 54.2 | 51 | 59 | 57.3 | 57 | 58.8 | 58.6 |
| | Change between prior and after impregnation | 10 | 9 | 5 | 2 | 2.1 | 2 | 3 | 3.3 | 1.8 | 4.2 | 4.2 |
| Impact resilience [%] | Prior to impregnation | 50 | 49.6 | 49.3 | 51 | 52.3 | 49.9 | 55 | 55 | 55.3 | 55.2 | 53.8 |
| | After impregnation | 39 | 42.5 | 41.9 | 48.5 | 48.5 | 46 | 50.4 | 47.3 | 54 | 50.7 | 47.8 |
| | Change between prior and after impregnation | −11 | −7.1 | −7.4 | −2.5 | −3.8 | −3.9 | −4.6 | −7.7 | −1.3 | −4.5 | −6 |
| Resistance value (Log Ω · m) | | 3.7 | 3.6 | 3.6 | 3.4 | 3.5 | 3.5 | 3.7 | 3.7 | 3.9 | 3.4 | 3.4 |

*1 Urethane foam having density: 60 kg/m$^3$, hardness: 60 (Ask-F), and air permeability: 90 cc/cm$^2$/sec, manufactured by Bridgestone Corporation
*2 Acrylic resin (acrylonitrile-alkyl acrylate copolymer emulsion) "BS-050301-1" having a solid content: 50%, manufactured by ENEX Co., Ltd.
*3 Silicone resin (aqueous dispersion of silicone resin) "BS-160617-1" having a solid content: 30% to 40%, manufactured by ENEX Co., Ltd.
*4 Carbon black (aqueous dispersion of carbon black) "PSM Black A898" having a solid content: 30% to 40%, manufactured by Mikuni-Color Ltd.
*5 Ketjen black (aqueous dispersion of ketjen black) "LION PASTE W-311N" having a solid content: 16.5%, manufactured by Lion Specialty Chemicals Co., Ltd.
*6 Amorphous silica mixture "KS-502", manufactured by Shin-Etsu Chemical Co., Ltd.

It is understood from the results shown in Table 1 that the conductive urethane foams of Examples exhibit relatively small changes in both hardness and impact resilience thereof between prior to and after their being impregnated with the binder resins, as compared with the conductive urethane foams of Comparative Examples. Further, it is understood that the conductive urethane foams of Examples exhibit relatively small or suppressed resistance values. Accordingly, it is reasonably concluded that the conductive urethane foams of Examples can retain relatively low resistance values, while curbing changes in hardness and impact resilience thereof between prior to and after their being impregnated with the binder resin.

INDUSTRIAL APPLICABILITY

According to the present disclosure, it is possible to provide a conductive urethane foam capable of curbing

The invention claimed is:

1. A conductive urethane foam including a urethane foam substrate material having a surface layer impregnated with a binder resin containing a conducting agent: wherein the binder resin contains 70 mass % or more of a silicone resin, wherein a content of the silicone resin in the conductive urethane foam is in the range of 0.3 to 6.0 parts by mass with respect to 100 parts by mass of the urethane foam substrate material, wherein the silicone resin is at least one selected from the group consisting of peroxide-curable silicone, condensation-type thermosetting silicone, addition-type thermosetting silicone, and cationic UV-curable silicone, wherein the binder resin is used in the form of an impregnation solution obtained by adding a solvent selected from water, toluene or ethyl acetate, and a viscosity of the impregnation solution is in the range of 5 cps to 300 cps (25° C.), and wherein the conducting agent is Ketjen black, and wherein a content of Ketjen black in the conductive urethane foam is in the range of 0.45 to 9.0 parts by mass with respect to 100 parts by mass of the urethane foam substrate material.

2. A toner supply roller, using the conductive urethane foam of claim 1.

3. The conductive urethane foam including a urethane foam substrate material having a surface layer impregnated with a binder resin containing a conducting agent of claim 1, wherein the solvent is selected from water or ethyl acetate.

* * * * *